US008134555B2

(12) United States Patent
Debevec et al.

(10) Patent No.: US 8,134,555 B2
(45) Date of Patent: Mar. 13, 2012

(54) ACQUISITION OF SURFACE NORMAL MAPS FROM SPHERICAL GRADIENT ILLUMINATION

(75) Inventors: Paul E. Debevec, Marina del Rey, CA (US); Wan-Chun Ma, Taipei (TW); Timothy Hawkins, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 960 days.

(21) Appl. No.: 12/105,141

(22) Filed: Apr. 17, 2008

(65) Prior Publication Data

US 2008/0304081 A1 Dec. 11, 2008

Related U.S. Application Data

(60) Provisional application No. 60/912,374, filed on Apr. 17, 2007.

(51) Int. Cl.
*G06T 15/00* (2011.01)
(52) U.S. Cl. ............... 345/426; 345/419; 345/619
(58) Field of Classification Search .......... 345/419, 345/426, 619
See application file for complete search history.

(56) References Cited

U.S. PATENT DOCUMENTS

| | | | |
|---|---|---|---|
| 6,069,565 A | 5/2000 | Stern et al. | |
| 7,436,403 B2 * | 10/2008 | Debevec | 345/426 |
| 2004/0227948 A1 | 11/2004 | Debevec et al. | |
| 2005/0276441 A1 | 12/2005 | Debevec | |
| 2006/0027809 A1 | 2/2006 | Ogawa et al. | |

OTHER PUBLICATIONS

Ma et al, Rapid Acquisition of Specular and Diffuse Normal maps from Polarized Spherical Gradient Illumination, Proceeding of Render techniques, Jun. 2007, pp. 183-194.*
International Search Report for PCT Application Serial No. PCT/US08/60663, mailed on Dec. 9, 2008.
Debevec Paul, Hawkins Tim, Tchou Chris, Duiker Haarm-Pieter, Sarokin Westley, Acquiring the reflectance field of a human face, SIGGRAPH 2000 Conference Proceedings, University of California at Berkeley.
Debevec Paul, Wenger Andreas, Tchou Chris, Gardner Andrew, Waese Jamie, Hawkins Tim, A lighting reproduction approach to live-action compositing, SIGGRAPH 2002, San Antonio, Jul. 21-26, 2002, University of Southern California Institute for Creative Technologies.

(Continued)

*Primary Examiner* — Phu Nguyen
(74) *Attorney, Agent, or Firm* — McDermott Will & Emery LLP (57) ABSTRACT

An apparatus for generating a surface normal map of an object may include a plurality of light sources having intensities that are controllable so as to generate one or more gradient illumination patterns. The light sources are configured and arranged to illuminate the surface of the object with the gradient illumination patterns. A camera may receive light reflected from the illuminated surface of the object, and generate data representative of the reflected light. A processing system may process the data so as to estimate the surface normal map of the surface of the object. A specular normal map and a diffuse normal map of the surface of the object may be generated separately, by placing polarizers on the light sources and in front of the camera so as to illuminate the surface of the object with polarized spherical gradient illumination patterns.

30 Claims, 3 Drawing Sheets

OTHER PUBLICATIONS

Gardner Andrew, Tchou Chris, Hawkins Tim, Debevec Paul, Linear light source reflectometry, University of Southern California Institute for Creative Technologies Graphics Laboratory, ACM Transactions on Graphics, pp. 749, 2003.

Wegner Andreas, Gardner Andrew, Tchou Chris, Unger Jonas, Hawkins Tim, Debevec Paul, Performance relighting and reflectance transformation with time-multiplexed illumination, University of Southern California Institute for Creative Technologies, ACM Trans. on Graphics, pp. 9, 2005.

* cited by examiner

ACQUISITION OF SURFACE NORMAL MAPS FROM SPHERICAL GRADIENT ILLUMINATION

CROSS-REFERENCE TO RELATED APPLICATIONS

This application claims the benefit of priority under 35 U.S.C. §119(e) from U.S. Provisional Application Ser. No. 60/912,374 entitled "Specular and Diffuse Normal Estimation and Rendering From Spherical Gradient Illumination" and filed on Apr. 17, 2007, by inventors Paul E. Debevec, Wan-Chun Ma, and Tim Hawkins. The provisional application Ser. No. 60/912,374 is incorporated herein by reference in its entirety.

STATEMENT REGARDING FEDERALLY SPONSORED RESEARCH

This work was made with government support under Grant Nos. DAAD19-99-D-0046 and W911NF-04-D-005, awarded by the Army Research Office. The government has certain rights in the invention.

BACKGROUND

Recent techniques for acquiring geometry and reflectance of objects have enabled richer and more realistic renderings in computer graphics. Many of these techniques use a combination of 3D scanning and photography under different lighting conditions to acquire 3D models of the object's shape and how it reflects light. When both of these characteristics are measured, the models can be used to faithfully render how the object would look from any angle, reflecting the light of any environment.

Some of the current reflectance acquisition techniques photograph an object under a small number of lighting conditions, and use this limited reflectance information to infer BRDFs (bidirectional reflectance distribution functions) across the entire object surface. However, such techniques miss some of the spatially-varying effects of specular reflections. Other techniques acquire object reflectance using many images of the object under a dense sampling of lighting directions. These techniques model spatially-varying BRDFs more accurately but are significantly more data intensive, complicating the capture of live objects.

There is a need for methods and systems that allow surface normal maps and reflectance information to be acquired from an object while overcoming these and other shortcomings.

SUMMARY

An apparatus for generating a surface normal map of an object may include a plurality of light sources having intensities that are controllable so as to generate one or more spherical gradient illumination patterns. The light sources configured and arranged to illuminate the surface of the object with the spherical gradient illumination patterns. A camera may receive light reflected from the illuminated surface of the object, and generate data representative of the reflected light. A processing system may process the data so as to estimate the surface normal map of the surface of the object. A specular normal map and a diffuse normal map of the surface may be generated separately, by placing polarizers on the light sources and in front of the camera so as to illuminate the surface of the object with polarized spherical gradient illumination patterns.

DETAILED DESCRIPTION

Methods and systems are described for estimating surface normal maps of an object from either its diffuse or specular reflectance using spherical gradient illumination patterns. In contrast to traditional photometric stereo, the spherical illumination patterns allow the normals to be estimated simultaneously from any number of viewpoints. Polarized lighting techniques are described that allow the diffuse and specular normal maps of an object to be measured independently. Applications of these techniques, including image rendering and structured light 3D scanning, are described.

Figure 1:
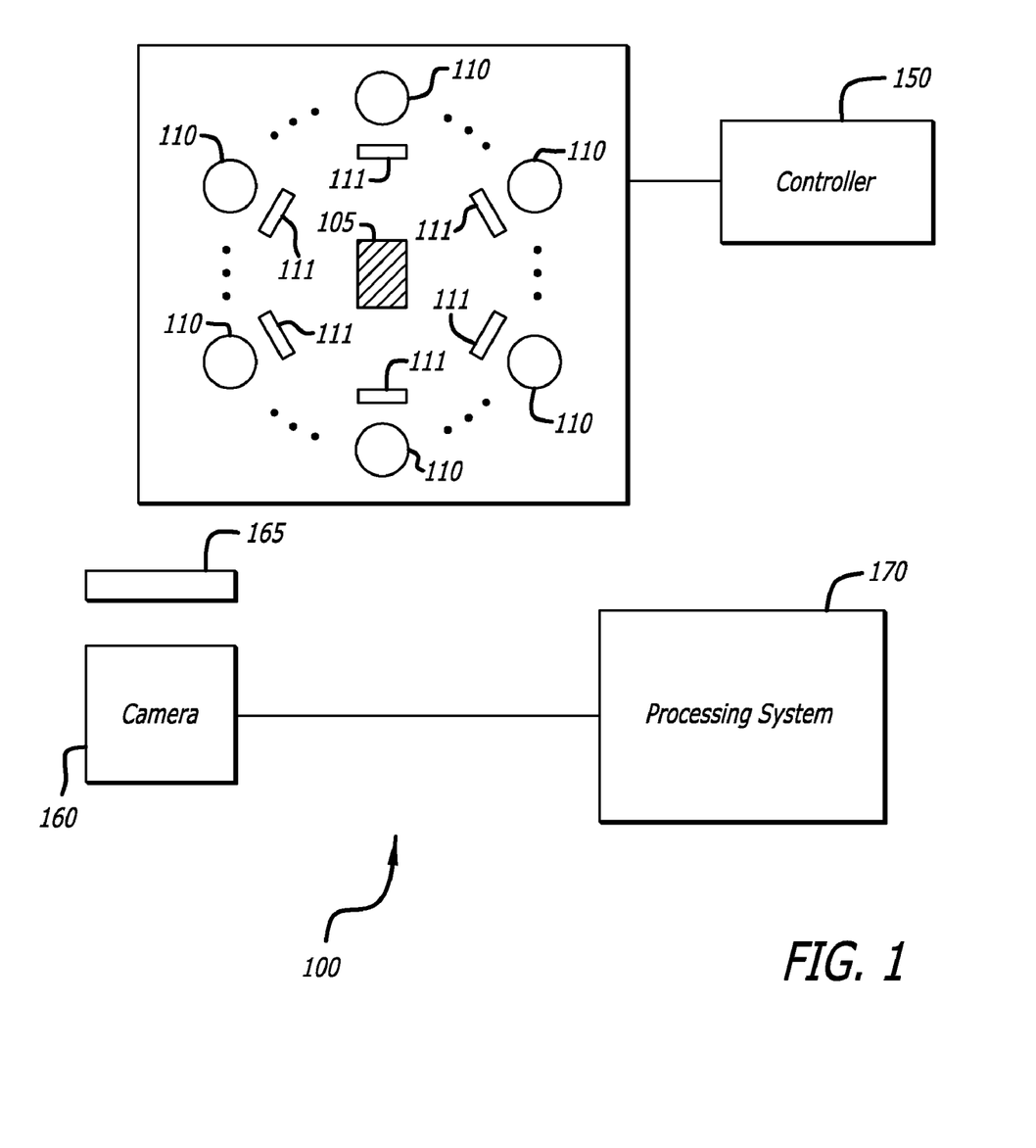
FIG. 1 is a schematic block diagram of a system for estimating surface normal maps of an object using spherical gradient illumination patterns, in one embodiment of the present disclosure.

FIG. 1 is a schematic block diagram of a system 100 for estimating surface normal maps of an object 105 using gradient illumination patterns, in one embodiment of the present disclosure. The system 100 includes a plurality of light sources, each labeled in FIG. 1 with reference numeral 110; an optical imaging system such as a camera 160; a controller 150; and a processing system 170. The plurality of light sources 110 may be LEDs (light emitting diodes) for example, or any other light sources known in the art. As one of many possible examples, the light sources 110 may include reflected light from a screen illuminated by a video projector. As another of many possible examples, the light sources 110 may include light from the pixels of a computer monitor.

The light sources 110 have intensities that are controllable so as to generate one or more gradient illumination patterns. In this disclosure, the term "gradient illumination pattern" means an illumination pattern generated by a plurality of light sources whose intensities are varied so as to form a ramp or gradient from a low intensity to a high intensity.

The light sources 110 are configured and arranged to illuminate the surface of the object 105 with the gradient illumination patterns, which in the illustrated embodiment are spherical gradient illumination patterns. In other words, the gradient illumination patterns generated by the light sources are substantially spherical in their angular extend surrounding the object.

The light sources 110 may be arranged in many different configurations. As just one example, the light sources may be arranged in a substantially spherical configuration around the object, so that the object is lit from each direction as determined by the location of each light source on the spherical configuration. Different configurations of the light sources may be used in different embodiments of the present disclosure.

In one of many possible embodiments, the plurality of light sources 110 may be shaped as a once-subdivided icosahedron that surrounds the object and that has a diameter of about a couple meters. A light source 110 may be placed on each edge and vertex of the icosahedron, yielding 156 light sources an average of 18° apart. Each light source may be built from three Luxeon V white LEDs (Light Emitting Diodes), which together may produce 360 lumens. Each light source may be focused toward the subject using a Fraen wide beam tri-lens optic, yielding 420 lux at 1 meter distance.

The controller 150 individually controls the intensities of the light sources 110 so as to generate the gradient illumination patterns, and drives the plurality of light sources 110 so as to illuminate the surface of the object 105 with the gradient illumination patterns.

The optical imaging system, e.g. camera 160, is configured to receive light reflected from the illuminated surface of the object 105, and to generate data representative of the reflected light. Such data may include data representative of the specular reflectance of the surface of the object, or data representative of the diffuse reflectance of the surface of the object, or a combination of both. Such data may also include data representative of the subsurface reflectance of the object. Descriptions of specular reflectance, diffuse reflectance, and surface normal maps may be found for example in published U.S. Pat. App. No. 20050276441 (entitled "Performance Relighting and Reflectance Transformation with Time-multiplexed Illumination"), owned by the assignee of the present disclosure, as well as in published U.S. Pat. App. No. 20040227948 (entitled "Reflectometry Apparatus and Method") also owned by the assignee of the present disclosure. Both published applications are incorporated herein by reference in their entireties.

The processing system 170 processes the data from the camera 160 so as to estimate the surface normal map of the object 105, as further described below. In one embodiment, the surface normal map may be acquired using just four spherical gradient illumination patterns which effectively compute the centroid and total energy of each pixel's reflectance function, i.e. the amount of light reflected toward the camera as the object is lit from each direction as determined by the location of the individual light sources, for example on a sphere as defined above.

To show how surface normals are computed from gradient illumination, the relationship between surface normals and reflectance function centroids measured through gradient illumination is described below. Due to the different behavior of diffuse and specular reflectance functions with respect to the surface normal, these cases are discussed separately. As shown below, in both cases only four spherical illumination patterns $P_i(\vec{\omega})$ defined on the sphere of directions $\vec{\omega} \in \Omega$ are needed. These four patterns are: a constant pattern $P_c(\vec{\omega})=1$, a linear gradient along the x-coordinate $P_x(\vec{\omega})=\vec{a}_x$, a linear gradient along the y-coordinate $P_y(\vec{\omega})=\vec{a}_y$, and a linear gradient along the z-coordinate $P_z(\vec{\omega})=\vec{a}_z$. Note that $(\vec{\omega})=[\vec{a}_x, \vec{a}_y, \vec{a}_z]$ are the components of the normalized vector corresponding to the direction $\vec{a}$.

Diffuse (or Lambertian) Surface Reflection.

The Lambertian BRDF defined over incident illumination $\vec{a}$ and normal $\vec{n}$ is given by: $R(\vec{\omega},\vec{n})=p_d F(\vec{\omega},\vec{n})$, where F is the foreshortening factor max, $(\vec{\omega},\vec{n}),0)$, and $p_d$ is the diffuse albedo. The observed reflectance $L_i$ from a view direction $\vec{v}$, excluding occlusions and inter-reflections, under a spherical illumination pattern $P_i$ is given by:

$$L_i(\vec{v})=\int_\Omega P_i(\vec{\omega})R(\vec{\omega},\vec{n})d\vec{\omega}. \quad (1)$$

In case of the gradient along the x-coordinate $P_x$ the reflectance can be derived as follows. The integral in Equation (1) is first expressed in a local shading frame $T=[\vec{s},\vec{t},\vec{n}]^T$, where $\vec{s}$ and $\vec{t}$ are freely chosen but orthogonal to each other and $\vec{n}$, such that the normal direction $\vec{n}$ is aligned to $\vec{z}=[0,0,1]$, and $\vec{a}=[\omega'_s, \omega'_t, \omega'_n]=T\vec{\omega}$. Equation (1) becomes:

$$L_i(\vec{v})=\int_\Omega(\omega'_s s_x + \omega'_t t_x + \omega'_n n_x)R$$

Because $R(\vec{\omega}',\vec{z})$ is not dependent on the first two components of $\vec{\omega}'$ (due to $\vec{z}$), the integral over the first two terms in Equation (2) equals 0. Working out the third term gives:

$$L_x(\vec{v})=n_x\left(\frac{2\pi\rho_d}{3}\right)$$

A similar result can be found for the y and z gradients. In all three cases the corresponding component of the diffuse normal is scaled by the constant $$\frac{2\pi\rho_d}{3}.$$

This constant can be divided out by normalizing the observed values.

The gradients $P_x$, $P_y$, and $P_z$ are defined in a $[-1,+1]$ range. Because it is impossible to emit light with negative intensity, the intensity values are translated and scaled to a $[0,+1]$ range:

$$P'_i = \frac{1}{2}(P_i + P_c).$$

The reflectance values under unweighted and untranslated gradient patterns can now be easily computed by: $L_i=2L'_i-L_c$. Although only three illumination patterns are needed to determine the surface normal, the constant illumination pattern is needed due to this practical limitation.

Specular Surface Reflection

A specular reflectance function may be defined as: $R(\vec{\omega},\vec{v},\vec{n})=S(\vec{r},\vec{\omega})F(\vec{\omega},\vec{n})$, where $\vec{r}=2(\vec{n}\cdot\vec{v})\vec{n}-\vec{v}$ is the specular reflected direction, and S is the specular reflectance lobe. Unlike Lambertian reflectance functions, a specular reflectance lobe S is mostly symmetrical around the perfect reflected direction. It is assumed that this lobe S is non-zero around a small solid angle around r, and that the foreshortening F is near constant in this solid angle. This assumption breaks down when (1) the extent of the lobe is large (i.e., glossy reflections), and (2) at grazing angles where the cosine changes rapidly.

The effect of the gradient over the x-coordinate $P_x$ is investigated. Similar to the Lambertian case, a change of variables is applied. However, in this case the reflected view vector is aligned with $\vec{z}=[0,0,1]$. This can be accomplished by a rotation T=where $\vec{s}$ and $\vec{t}$ are orthogonal vectors both orthogonal to $\vec{r}$.

$$L_x(\vec{v})=\int_\Omega(\omega'_s s_x + \omega'_t t_x + \omega'_r r_x)S(\vec{z},\vec{\omega}')F(\vec{\omega}',\vec{n}')d\vec{\omega}' \quad (4)$$

where $\vec{\omega}'=[\omega'_s,\omega'_t,\omega'_r]=T\vec{\omega}$, and $\vec{n}'=T\vec{n}$.

The assumption was made that F is approximately constant in the solid angle where S is non-zero. This constant is denoted by $c_F$:

$$L_x(\vec{v}) = c_F \int_\Omega (\omega'_s s_x + \omega'_t t_x + \omega'_r r_x) S(\vec{z}, \vec{\omega}') d\vec{\omega}', \quad (5)$$

Again the first two terms are 0 due to the symmetry of the specular lobe S around $\vec{r}$, yielding:

$$L_x(\vec{v}) \approx r_x c_F \int_\Omega \omega'_z S(\vec{z}, \vec{\omega}') d\vec{\omega}'. \quad (6)$$

Similar expressions can be obtained for the y and z gradients. All expressions contain the same integral, which depends on the exact definition of S, and the same constant $c_F$. Normalizing the vector $[L_x(\vec{v}), L_y(\vec{v}), L_z(\vec{v})]$ yields $\vec{r} = [r_x, r_y, r_z]$ which is the reflected direction of the view direction. The normalized halfway vector between $\vec{r}$ and $\vec{v}$ corresponds to the specular normal direction.

The two derivations described above may be intuitively understood as follows. First, it can be observed that BRDFs are largely symmetrical around the normal or reflected direction for diffuse and specular BRDFs respectively. Second, it is intuitively clear that the centroid (i.e., mean) of the BRDF lies on this symmetry axis. Thus, by measuring the centroid, the normal can be easily derived. Computing the centroid (also called the first moment in statistics) of 1D function can be achieved by integrating this function against a linear gradient. The presented spherical gradient functions are the extensions of a linear gradient to a spherical domain.

Illumination effects such as inter-reflections and self-shadowing will change the symmetry of the reflectance functions. More specifically, this implies that the first two terms in Equations (2) and (5) are probably not zero, and thus skew the derived normal directions. Furthermore, the error on the specular normal is also dependent on how specular the BRDF is. A wide specular lobe can introduce errors due to (1) variation in F over the lobe, (2) partial occlusion of the specular lobe, and (3) off-specular reflection. When view-point is fixed and lighting direction varied, off-specular reflection is not a significant effect. This is due to the tendency of errors (1) and (3) to cancel each other.

Real reflectance functions are rarely completely diffuse or specular, and are mostly a mix of both. Ignoring either the diffuse or specular component will result in a skewed normal. To address this, methods and systems for separating the diffuse and specular components based on polarization are discussed below.

Separating Specular and Diffuse Reflectance Components Under Spherical Illumination As shown above, estimates of surface normals from gradient illumination can be made for objects whose reflectance is either diffuse or specular. Since most surfaces exhibit a combination of specular and diffuse reflectance, it is desirable to estimate normals for the object from each component independently. As described below, polarization-based techniques may be used to separate the diffuse and specular components.

In an embodiment in which a specular normal map and a diffuse normal map of a surface of an object are generated separately and independently, the system 100 may further include a set of polarizers 111 for the light sources, and a camera polarizer 165, i.e. a polarizer for the camera 160. As further described below, the set of polarizers 111 are adapted to be placed over the light sources 110 so as to polarize light from the light sources 100, so that the light sources (each having a polarizer 111 placed over it) illuminate the surface of the object 105 with one or more polarized spherical gradient illumination patterns. The camera polarizer 165 polarizes the reflected light in a way that specularly reflected light is separated from diffusely reflected light, before the reflected light is received by camera, as further described below. In this embodiment, the processing system 170 is configured to generate specular reflectance data representative of the specularly reflected light and diffuse reflectance data representative of the diffusely reflected light, and to separately estimate a specular normal map from the specular reflectance data and a diffuse normal map from the diffuse reflectance data.

The polarizers 111 may either be linear polarizers, or circular polarizers, the use of both of which is further described below. For linearly polarized illumination, for example, a linear polarizer may be mounted on a servomotor in front of the camera, allowing the polarizer to be rapidly flipped on its diagonal between horizontal and vertical orientations. For circular polarization, a circular polarizer placed in front of the camera may be manually flipped. In one embodiment, the polarizers may be individually tunable polarizers.

In one embodiment, the set of polarizers 111 may be linear polarizers oriented so as to polarize the light from the light sources so that after reflection of the light by the object toward the camera, the specularly reflected light is polarized in a consistent direction, while the camera polarizer 165 may be a linear polarizer that is oriented in such a way as to attenuate polarized specular light reflected by the object.

Linear Polarization

Specular reflection is a relatively simple surface interaction arising at any interface between two media with differing indices of refraction. Denoting the index of refraction of the material by n, specular reflection from the surface is governed by the Fresnel equations:

$$r_s = \frac{\sin(\theta_t - \theta_i)}{\sin(\theta_t + \theta_i)}, r_p = \frac{\tan(\theta_t - \theta_i)}{\tan(\theta_t + \theta_i)}$$

where $r_s$ is the ratio of the reflected to incident electric field component perpendicular to the plane of incidence, $r_p$ is the corresponding ratio for the parallel component, $\theta_i$ is the angle of incidence and $\theta_t$ is the refracted angle, given by $$\theta_t = \arcsin\left(\frac{1}{n}\sin\theta_i\right).$$

These equations imply that the polarization state of the specularly reflected light is determined by the polarization state of the incident light. In contrast, diffuse reflection arises from multiple surface reflections or subsurface scattering and is almost completely unpolarized regardless of the polarization characteristics of the incident illumination. This is why the diffuse and specular components of reflected light can be effectively separated by controlling the polarization state of the incident light while also measuring the polarization state of the reflected light.

For a single camera and assuming the light source lies in a horizontal plane including the camera and subject, it is known to use linear polarizers placed over the light source and camera to perform this separation. This may be done by placing a vertical polarizer over the light source, which given the horizontal plane of incidence assures that the outgoing specular reflection will also be vertically polarized. A horizontal polarizer in front of the camera will then block all of the specularly reflected light, but only half of the diffusely reflected light, yielding an image $$I_1 = \frac{1}{2}I_D.$$

Similarly, a vertical polarizer in front of the camera will yield $$I_2 = \frac{1}{2}I_D + I_S.$$

The diffuse and specular image components are then $I_D=2I_1$ and $I_S=I_2-I_1$.

In the embodiment illustrated in FIG. 1, the object is illuminated with many lights simultaneously and it is not desirable to limit the light placement to a horizontal plane. One must thus create a spherical direction field of linear polarization for the lights designed so that the light reflected specularly in accordance with Equation (7) toward the camera viewpoint will be vertically polarized regardless of the angle of incidence (i.e. which light it originated from).

Figure 2:
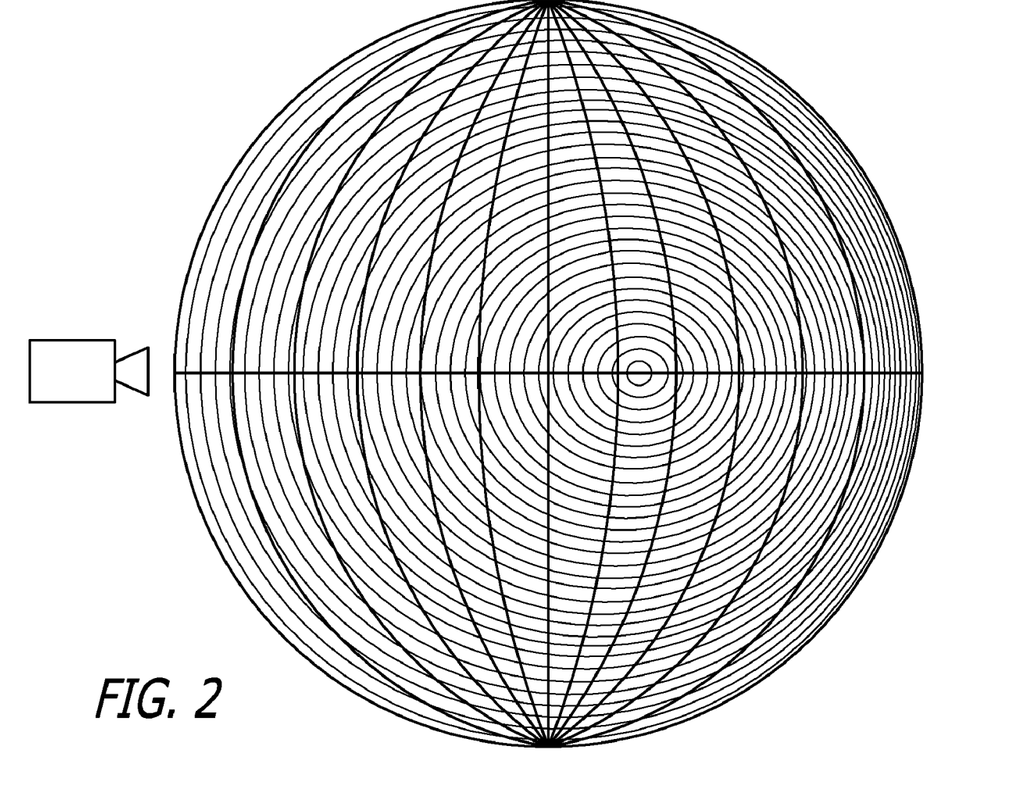
FIG. 2 is a hemispherical angular map representation of directions of linear polarization for independently observing the specular and diffuse reflection for a full sphere of illumination.

In practice, this pattern may be created by individually tuning linear polarizers placed over each light source on the sphere to minimize the observed specular reflection from a spherical test object as viewed through the camera's linear polarizer. This pattern can also be found through numerical optimization, the result of which can be seen in FIG. 2. FIG. 2 is a hemispherical angular map representation of directions of linear polarization for independently observing the specular and diffuse reflection for a full sphere of illumination.

The intensity of the reflected specular component from a surface element oriented along the halfway vector depends not only on the specular albedo $\rho_s$ but also on the incident light direction itself as specified by the Fresnel equations. This effect must be divided out when interpreting the reflected specular light as $\rho_s$. Near the Brewster angle, the specular reflection becomes very weak, making recovery of $\rho_s$ unreliable for these angles.

Circular Polarization

In one embodiment, circular polarization may be used to obtain view-independent diffuse/specular separation. Circular polarizers have chirality but not direction. Distributing circular polarizers of the same chirality over a sphere provides a polarization field which is not only smoothly varying but also symmetric with respect to choice of camera viewpoint. This preserves the viewpoint independence established by using linear gradient patterns in the first place.

One disadvantage of this approach may be that because the ratios $r_s$ and $r_p$ differ, circular polarization typically becomes elliptical on reflection. Thus separating diffuse and specular reflections accurately requires the capture of four images, three to characterize the polarization ellipse and one to characterize the amount of unpolarized light. In addition, this recovery process is very sensitive to noise and miscalibration of the polarization filters, particularly when the specular intensity is high relative to the diffuse intensity.

Instead, one can take advantage of the fact that $r_s$ and $r_p$ are roughly equal for moderate angles of incidence, causing the polarization of the specularly reflected light to remain nearly circular. Capturing only two images, one with a circular polarizer and another with the same filter placed backwards, then allows specular and diffuse components to be separated in the same way as for the linearly polarized case. In practice, the diffuse and specular components can be well separated for a cone of light sources surrounding each camera. Typically the half-angle of this cone may be about 70°, with separation degrading rapidly beyond this angle. Surfaces more oblique than this may be captured from a different viewpoint, which will also serve to minimize foreshortening.

To perform the separation, circular polarizers were placed over each light source on the sphere, in one embodiment of the present disclosure. To cancel out the specular reflections, a circular polarizer of the same sense was placed over the camera. This is because reflection from a dielectric reverses the handedness of the circular polarization. As with separation by linear polarization, this diffuse image can be expressed as $I_1=\frac{1}{2}I_D$. By reversing the circular polarizer over the camera, we capture another image $I_2=\frac{1}{2}(I_D+I_S)$. Note that this differs from the $I_1$ of the linearly polarized case in that only half of Is is transmitted. The diffuse and specular components are then $I_D=2I_1$ and $I_S=2(I_2-I_1)$. The results of circular separation were seen to agree well with those recovered using linear polarization for those parts of the object not too steeply inclined away from the camera. In particular, the characteristic sharp appearance of the specular normal map and blurred appearance of the diffuse normal map were evident over the central portion of the object.

One application of the methods and systems described above is image rendering, i.e. the specular and diffuse normal maps estimated as described above may be used to render an image of the object. As known, a rendered image consists of a plurality of pixels, each pixel having an associated pixel value that represents the image brightness of a corresponding surface unit area on the surface of the object.

An image rendering system in one embodiment of the present disclosure includes all the components previously shown and described in conjunction with FIG. 1, i.e. a set of lights, one or more cameras, polarizers for the lights and the camera(s), and a processing system. In an embodiment in which the specular and diffuse normal maps are used to render an image of the object, the processing system is further configured to render an image of the object using hybrid normal mapping, further described below. In other words, the processing system is configured to render a specular reflectance component of each of the pixels in the image using the specular normal map estimated from the specular reflectance data, and to render a diffuse reflectance component of each of the pixels in the image using the diffuse normal map estimated from the diffuse reflectance data.

Image Rendering with Hybrid Normal Maps

For translucent surfaces the three color channels of the diffuse (subsurface) reflection and the intensity channel of the specular reflection each produce different estimates of the surface normals. Generally, the specular normals derived from the surface reflection tend to be the best estimates of true surface orientation. The diffuse normals tend to be "bent" on a local scale due to the diffusion of light within the material, producing a normal map that appears smoother than the true surface. The three diffuse normal maps for the RGB (red, green, and blue) channels show this effect to varying degrees due to the wavelength-dependence of the scattering behavior of light within the material. For skin, the red channel normals exhibit the most smoothing, and the blue channel normals exhibit the least.

These different normal estimates may be used to visually approximate some of the appearance of translucent materials in a real-time rendering framework. This may be done using hybrid normal mapping wherein the diffuse component of each color channel is shaded or rendered using the diffuse normals recovered from that channel, and similarly the specular component is shaded or rendered using normals recovered from the specular channel. In one embodiment, this may be easily accomplished using GPU multi-texturing. The images taken under the full-on pattern may be used to generate the diffuse and specular albedo maps. To create realistic renderings, specular roughness parameters may be chosen so that the rendered appearance best matches a reference image of the object under point-source illumination.

Images rendered from a relatively low-resolution model using hybrid normal mapping tend to exhibit a locally translucent appearance for organic objects such as a face, a hand, or a piece of fruit while revealing surface details in the rendered specular highlights. Rendering with separately recovered surface normals for the diffuse red, green, and blue components, as compared with simply using the diffuse normal recovered from the green channel for all three color channels, generates improved results. Also, by using different normals maps for each color channel, improved reproduction of wavelength dependent translucency is achieved. In general, hybrid map renderings were seen to closely match actual images of the subject under point-source illumination.

In one embodiment, an animated normal map of a live facial performance can be acquired using time-multiplexed illumination. Since just four lighting conditions are needed, normals can be acquired using a much slower frame rate than the thousands of frames per second that have been used in previous time-multiplexed illumination approaches. In this embodiment, three digital video cameras may be used, running at 120 fps, cycling through the four lighting conditions at 30 Hz to capture the performance. This frame rate is attainable with a variety of machine vision and motion picture cameras. As done in previous works, optical flow may be used to temporally align each set of four conditions. One benefit of determining surface normals using gradient illumination is that the same set of four patterns works equally well for any viewpoint, with each yielding surface normal estimates in world space coordinates. This follows from the fact that images of a subject photographed under the four gradient patterns can be transformed to any other set of gradient illumination directions using a rotation matrix.

High Resolution Geometry Scanning

Figure 3:
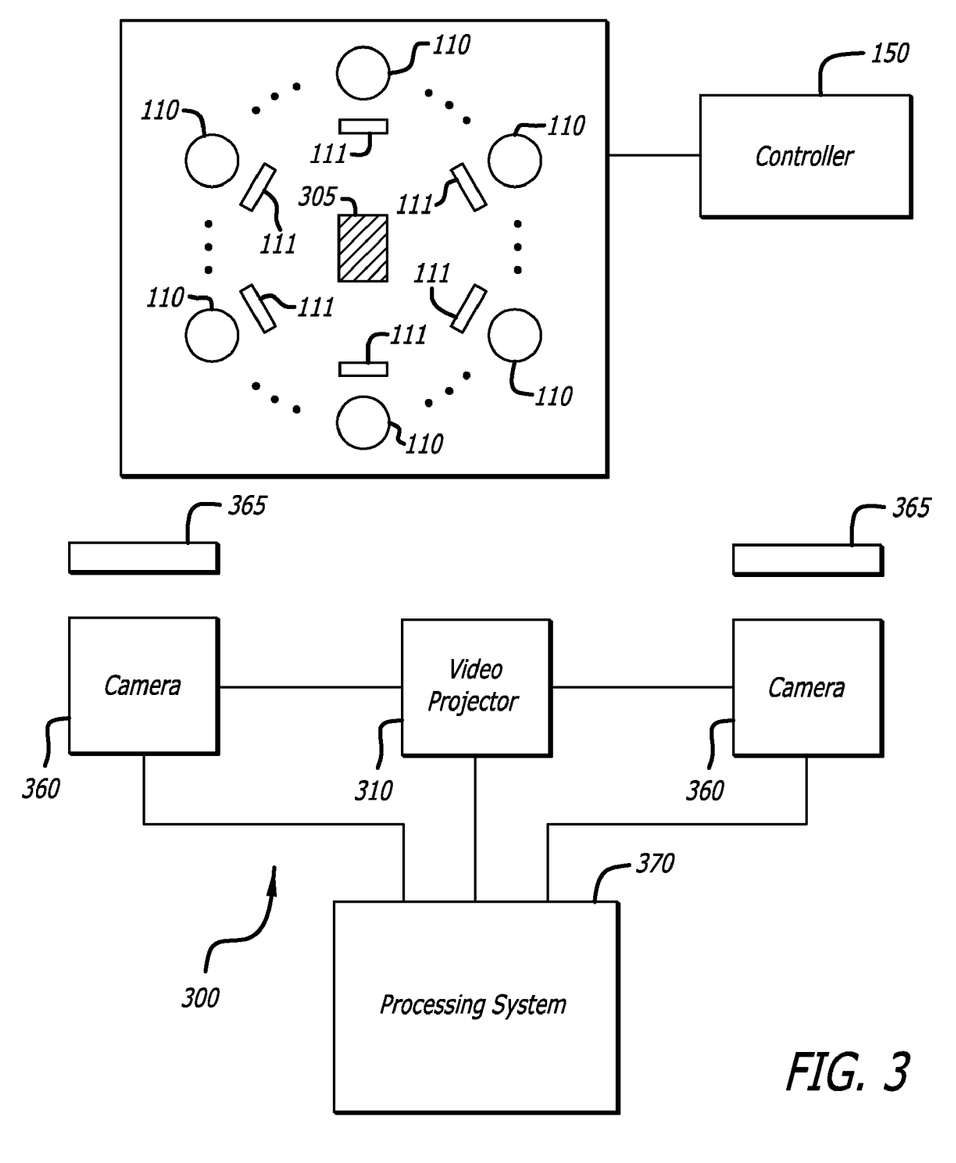
FIG. 3 is a schematic block diagram of a structured light scanning system that uses high-resolution specular normal maps to generate a high resolution scan of a surface of an object.

Another application of the surface normal map estimating systems and methods described above is high resolution geometry scanning. FIG. 3 is a schematic block diagram of a structured light scanning system 300 that uses high-resolution specular normal maps to generate a high resolution scan of a surface of an object 305. In addition to light sources 110, polarizers 111, camera(s) 360, and camera polarizers 365, the descriptions of which have been provided above, the scanning system 300 includes a video projector 310 configured to project one or more structured light patterns onto the illuminated surface of the object. Also as further described below, the processing system 370 for the high resolution scanning system 300 is further configured to increase the resolution of the photographic data using a specular normal map that was estimated separately from the diffuse normal map, using the polarization techniques described above.

In one embodiment, high-resolution surface geometry of an organic subject can be captured by combining a medium resolution structured light scan or other traditional 3D scanning process with high-resolution surface normals based on the specular reflectance. For example, a structured-light stereo technique may use a stereo pair of SLR cameras, both indicated with reference numeral 360, with the video projector 310 placed between them. As described above, the video projector 310 projects a structured light pattern onto the illuminated surface of the object 305. In one embodiment, the structured light pattern includes four colored stripe patterns $S_i$ and one uniform white pattern W. Correspondences between the two cameras are computed by finding best matches of the ratios $S_i/W$.

In one embodiment, a three-dimensional scanning system may be used that can obtain a medium resolution three-dimensional scan of the object's geometry. A polarizer (other that the set of polarizers 111) may be used that is configured and arranged to polarize the reflected light so that specularly reflected light is separated from diffusely reflected light, before the reflected light is received by the three-dimensional scanning system. In this embodiment, the processing system may be configured to generate specular reflectance data representative of the specularly reflected light and to estimate a specular normal map from the specular reflectance data, and to increase the resolution of the geometry obtained from the three-dimensional scanning system, using the specular normal map.

In one embodiment, a human subject was captured using the above scanning system 300, as follows. First, the eight images (four gradient patterns under two linear polarization states) were taken, then the five structured light images were taken, for a total of 13 images. Using Canon 5D cameras in "burst mode", this required just five seconds to capture data at 12 megapixel resolution.

Due to image noise and the limited resolution of the projector, the structured light scan included some biasing and noise at high frequencies. Additional smoothing of the surface geometry resulted from the light scattering within the subject. To recover the missing detail, the recovered diffuse or specular normals were used, together with an embossing technique. First, the structured light scan was smoothed using bilateral denoising. Next, a surface normal map was created from the smoothed mesh. High frequency details of the estimated normals were extracted using high-pass filtering, and then these details were added to the smoothed geometric normals. Finally, the mesh vertices were optimized to match this assembled normal map using an embossing process known in the art.

Geometry recovered in this way using diffuse or specular normals showed that the specular normals recover detailed surface shape much better than the diffuse normals, as expected. Visually, the geometry acquired using the specular normal map appeared to have the better surface detail compared to the laser scan. A high-resolution geometry scan for a face and a hand derived from structured light and specular normal maps showed that skin details, such as wrinkles, pores, and palm prints, were well-preserved. Both models contained more than one million vertices. These meshes, the recovered specular and diffuse albedo maps, and manually selected subsurface scattering and specular roughness parameters could be used to generate the realistic renderings.

In sum, methods and systems have been described for acquiring specular and diffuse normal maps using a small number of gradient illumination patterns. Polarization techniques were described for diffuse-specular separation under spherical illumination. These techniques allowed high-resolution surface detail to be recorded from the specular component of hybrid surfaces. A high-resolution scanning system and method were described that use these techniques in conjunction with structured light to produce fast high-resolution scans of organic materials. A hybrid normal map technique for image rendering was described, in which different recovered normal maps were used for shading the diffuse and specular components, to efficiently approximate some of the effects of surface translucency. Due to the low number of illumination patterns, the methods and systems described above were also suitable for real-time normal capture using time-multiplexed illumination.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of what is disclosed above. Thus, the apparatuses and methods described above are not intended to be limited to the embodiments shown herein, but are to be accorded the full scope consistent with the claims, wherein reference to an element in the singular is not intended to mean "one and only one" unless specifically so stated, but rather "one or more."

All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether or not such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for generating a surface normal map of an object, comprising:
    a plurality of light sources having intensities that are controllable so as to generate one or more gradient illumination patterns, the light sources configured and arranged to illuminate the surface of the object with the gradient illumination patterns;
    an optical imaging system configured to receive light reflected from the illuminated surface of the object, and to generate data representative of the reflected light; and
    a processing system configured to process the data so as to estimate the surface normal map of the object.

2. The apparatus of claim 1, wherein the gradient illumination patterns are substantially spherical in their angular extent surrounding the object.

3. The apparatus of claim 1, wherein the data representative of the reflected light comprise data representative of specular reflectance of the surface of the object.

4. The apparatus of claim 1, wherein the data representative of the reflected light comprise data representative of diffuse reflectance of the surface of the object.

5. The apparatus of claim 1, wherein the data representative of the reflected light comprise data representative of subsurface reflectance of the object.

6. The apparatus of claim 1, wherein the plurality of light sources comprise LEDs.

7. The apparatus of claim 1, wherein the plurality of light sources comprise reflected light from a screen illuminated by a video projector.

8. The apparatus of claim 1, wherein the plurality of light sources comprise light from pixels of a computer monitor.

9. The apparatus of claim 1, further comprising a controller configured to individually control the intensities of the light sources so as to generate the gradient illumination patterns and to drive the plurality of light sources so as to illuminate the surface of the object with the gradient illumination patterns.

10. The apparatus of claim 1, wherein the gradient illumination patterns comprise:
    a substantially constant spherical illumination pattern;
    a substantially linear gradient illumination pattern along an x-axis;
    a substantially linear gradient illumination pattern along a y-axis; and
    a substantially linear gradient illumination pattern along a z-axis.

11. The apparatus of claim 1, wherein the data representative of the reflected light comprise a plurality of pixels; and
    wherein the surface normal map provides a surface normal value for each pixel.

12. The apparatus of claim 1, wherein the plurality of light sources are arranged in a substantially spherical configuration around the object.

13. A method of generating a surface normal map of an object, comprising:
    illuminating a surface of the object with one or more gradient illumination patterns using a plurality of light sources;
    generating data representative of the light reflected from the illuminated surface of the object using an optical imaging system; and
    processing the data so as to estimate the surface normal map of the object using a processing system.

14. The method of claim 13, wherein the gradient illumination patterns are substantially spherical in their angular extent surrounding the object.

15. The method of claim 13, wherein the data representative of the reflected light comprise data representative of at least one of:
    specular reflectance of the surface of the object;
    diffuse reflectance of the surface of the object; and
    subsurface reflectance of the object.

16. An apparatus for separately generating a specular normal map and a diffuse normal map of a surface of an object, comprising:
    a plurality of light sources having intensities that are controllable so as to generate one or more gradient illumination patterns;
    a set of polarizers adapted to be positioned relative to the light sources so as to polarize light from the light sources;
    wherein the light sources and the set of polarizers are arranged to illuminate the surface of the object with one or more polarized gradient illumination patterns;
    a camera configured to receive light that is reflected from the illuminated surface of the object, and to generate from the reflected light photographic data of the surface of the object;
    a camera polarizer configured to polarize the reflected light in a way that specularly reflected light is separated from diffusely reflected light, before the reflected light is received by camera; and
    a processing system configured to generate, from the photographic data, specular reflectance data representative of the specularly reflected light and diffuse reflectance data representative of the diffusely reflected light, the processing system further configured to estimate a specular normal map from the specular reflectance data and a diffuse normal map from the diffuse reflectance data.

17. The apparatus of claim 16, wherein the diffuse normal map comprises a first diffuse normal map for a red color channel in the photographic data, a second diffuse normal map for a blue color channel in the photographic data, and a third diffuse normal map for a green color channel in the photographic data.

18. The apparatus of claim 16, wherein the set of polarizers and the camera polarizer comprise linear polarizers.

19. The apparatus of claim 16, wherein the set of polarizers comprise linear polarizers oriented so as to polarize the light from the light sources so that after reflection of the light by the object toward the camera the specularly reflected light is polarized in a consistent direction, and wherein the camera polarizer comprises a linear polarizer adapted to be oriented to attenuate polarized specular light reflected by the object.

20. The apparatus of claim 16, wherein the plurality of polarizers and the camera polarizer comprise circular polarizers.

21. The apparatus of claim 16, wherein the plurality of polarizers are configured to circularly polarize light along a first direction, and the camera polarizer is configured to circularly polarize light along a second direction; and wherein the first direction and the second direction are the same.

22. The apparatus of claim 16, wherein the plurality of polarizers and the camera polarizer comprise individually tunable polarizers, and wherein the plurality of polarizers and the camera polarizer are tunable so as to minimize observed specular reflection from the object as viewed through the camera polarizer.

23. The apparatus of claim 16, further comprising a controller configured to individually control the intensities of the light sources so that the light sources and the polarizers generate the polarized spherical gradient illumination patterns, the controller further configured to drive the plurality of light sources so that the light sources and the polarizers illuminate the surface of the object with the polarized spherical gradient illumination patterns.

24. A method of separately generating a specular normal map and a diffuse normal map of a surface of an object, comprising:
   illuminating the surface of the object with one or more polarized spherical gradient illumination patterns using a plurality of light sources;
   polarizing light reflected from the illuminated surface of the object in a way that separates specularly reflected light from diffusely reflected light using a set of polarizers;
   generating specular reflectance data representative of the specularly reflected light and diffuse reflectance data representative of the diffusely reflected light using an optical imaging system;
   estimating a specular normal map from the specular reflectance data using a processing system; and
   estimating a diffuse normal map from the diffuse reflectance data using the processing system.

25. The method of claim 24, wherein the act of illuminating the surface of the object with polarized spherical gradient illumination patterns comprises placing a set of polarizers on a plurality of controllable light sources, and driving the light sources so as to generate the polarized spherical gradient illumination patterns.

26. The method of claim 24, wherein the act of polarizing light reflected from the illuminated surface of the object in a way that separates specularly reflected light from diffusely reflected light comprises placing a camera polarizer in front of a camera that receives light reflected from the illuminated surface of the object, and tuning the set of polarizers and the camera polarizer so as to minimize the specular reflection from the object as viewed through the camera polarizer.

27. An image rendering system for rendering an image of an object, the image comprising a plurality of pixels, the image rendering system comprising:
   a plurality of light sources having intensities that are controllable so as to generate one or more spherical gradient illumination patterns;
   a set of polarizers adapted to be positioned relative to the light sources so as to polarize light from the light sources;
   wherein the light sources and the set of polarizers are arranged to illuminate the surface of the object with one or more polarized spherical gradient illumination patterns;
   a camera configured to receive light that is reflected from the illuminated surface of the object, and to generate from the reflected light photographic data of the surface of the object;
   a camera polarizer configured to polarize the reflected light, the camera polarizer having an orientation relative to the set of polarizers that is adjustable so as to separate specularly reflected light from diffusely reflected light, before the reflected light is received by the camera; and
   a processing system configured to generate specular reflectance data for the specularly reflected light and diffuse reflectance data for the diffusely reflected light, and to estimate a specular normal map from the specular reflectance data and a diffuse normal map from the diffuse reflectance data;
   the processing system further configured to render a specular reflectance component of each of the pixels in the image using the specular normal map estimated from the specular reflectance data, and to render a diffuse reflectance component of each of the pixels in the image using the diffuse normal map estimated from the diffuse reflectance data.

28. A method of rendering an image of an object, the image comprising a plurality of pixels, the method comprising:
   illuminating the surface of the object with one or more polarized spherical gradient illumination patterns;
   polarizing light reflected from the illuminated surface of the object in a way that separates specularly reflected light from diffusely reflected light;
   generating specular reflectance data representative of the specularly reflected light and diffuse reflectance data representative of the diffusely reflected light;
   estimating a specular normal map from the specular reflectance data, and separately estimating a diffuse normal map from the diffuse reflectance data;
   rendering a specular reflectance component of each of the pixels in the image using the specular normal map estimated from the specular reflectance data; and
   rendering a diffuse reflectance component of each of the pixels in the image using the diffuse normal map estimated from the diffuse reflectance data.

29. A high resolution scanning system, comprising:
   a plurality of light sources having intensities that are controllable so as to generate one or more spherical gradient illumination patterns;
   a set of polarizers adapted to be positioned relative to the light sources so as to polarize light from the light sources;
   wherein the light sources and the set of polarizers are arranged to illuminate the surface of the object with one or more polarized spherical gradient illumination patterns;
   a three-dimensional scanning system configured to obtain a three-dimensional scan of the illuminated object's geometry, the three dimensional scan having a substantially medium resolution;

another polarizer configured and arranged to polarize the reflected light so that specularly reflected light is separated from diffusely reflected light, before the reflected light is received by the scanning system;

a processing system configured to generate specular reflectance data representative of the specularly reflected light and to estimate a specular normal map from the specular reflectance data, the processing system further configured to increase resolution of the geometry obtained from the three-dimensional scanning system, using the specular normal map.

30. A high resolution scanning system, comprising:

a plurality of light sources having intensities that are controllable so as to generate one or more spherical gradient illumination patterns;

a set of polarizers adapted to be positioned relative to the light sources so as to polarize light from the light sources;

wherein the light sources and the set of polarizers are arranged to illuminate the surface of the object with one or more polarized spherical gradient illumination patterns;

a video projector configured to project one or more structured light patterns onto the illuminated surface of the object;

one or more cameras configured to receive light that is reflected from the illuminated surface of the object on which the structured light patterns have been projected, and to generate photographic data from the received light;

a camera polarizer configured and arranged to polarize the reflected light so that specularly reflected light is separated from diffusely reflected light, before the reflected light is received by camera;

a processing system configured to generate specular reflectance data representative of the specularly reflected light and to estimate a specular normal map from the specular reflectance data, the processing system further configured to increase the resolution of the photographic data using the specular normal map.

* * * * *